July 20, 1926.

C. A. PARSONS ET AL

CONTROL OF THE RELATIVE AXIAL POSITION OF MEMBERS SUCH
AS THE ROTOR AND STATOR OF A TURBINE

Filed March 28, 1925   3 Sheets-Sheet 1

1,593,031

INVENTORS:
CHARLES A. PARSONS
HEREWARD I. BRACKENBURY
LOUIS M. DOUGLAS

By Spear, Middleton, Donaldson, Hall
Attys.

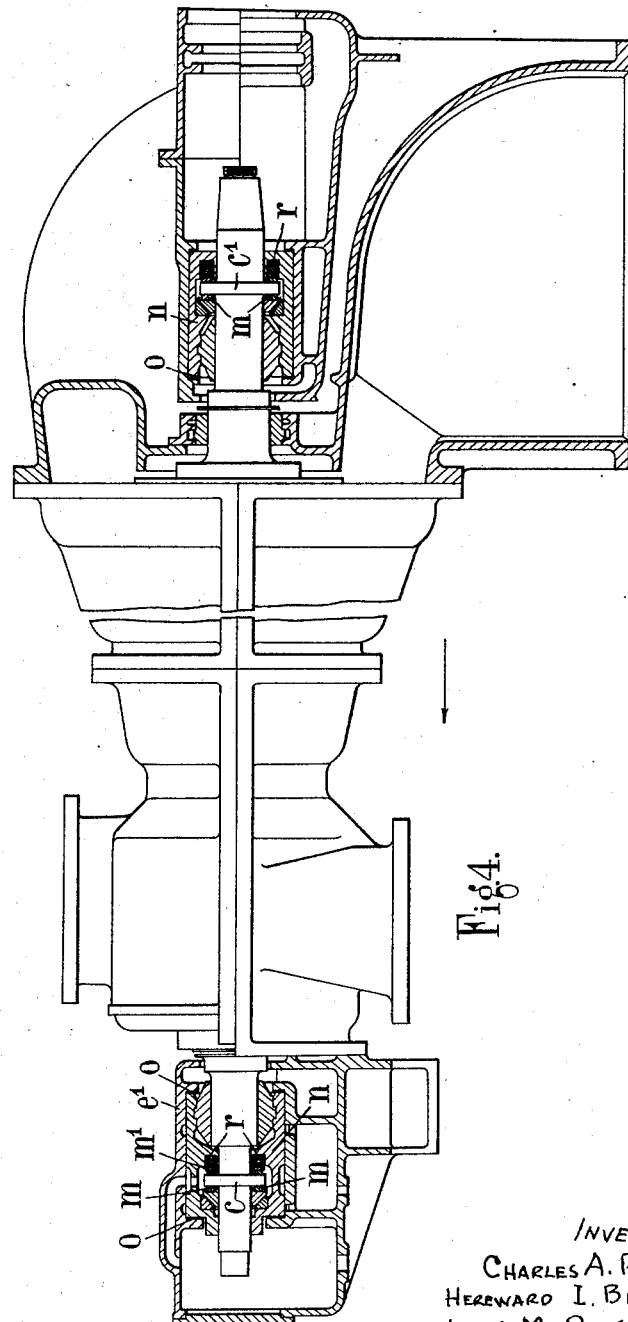

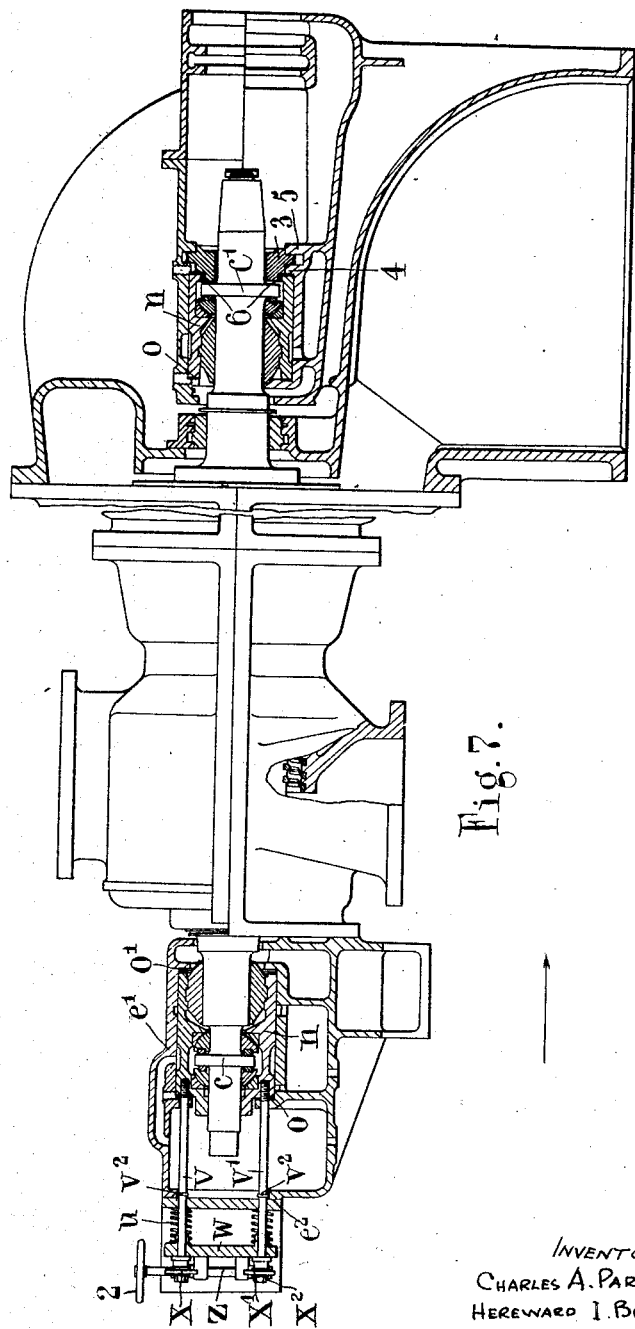

Patented July 20, 1926.

1,593,031

UNITED STATES PATENT OFFICE.

CHARLES ALGERNON PARSONS, HEREWARD IRENIUS BRACKENBURY, AND LOUIS MORTIMER DOUGLAS, OF NEWCASTLE-ON-TYNE, ENGLAND; SAID BRACKENBURY AND SAID DOUGLAS ASSIGNORS TO SAID PARSONS.

CONTROL OF THE RELATIVE AXIAL POSITION OF MEMBERS SUCH AS THE ROTOR AND STATOR OF A TURBINE.

Application filed March 28, 1925, Serial No. 19,123, and in Great Britain April 25, 1924.

The invention relates to the control of the relative axial position of members such as the rotor and stator of a turbine, though likewise applicable to other rotary devices. In a turbine, for example, of the axial-flow type, it is in some cases necessary in order to secure the highest efficiency that the rotor and stator should be run with a minimum of axial blade clearance while with many forms of dummy, gland or other packings in which the clearance is variable or adjustable by axial movement, the same requirement occurs.

Owing to differential longitudinal expansion of the rotor and stator due to temperature changes or to other causes, such as unequal longitudinal strains arising from changes of load, the axial clearances, in order to provide a margin of safety, must not be reduced below a certain minimum which is greater than desirable for efficiency in working, and the main object of this invention is to enable machines of the kind in question to be operated with smaller axial clearances than heretofore without danger of the parts concerned fouling when operating conditions change.

With such an object:—

The invention consists in the combinations of elements hereinafter described and particularly pointed out in the claims.

Referring to the accompanying drawings:—

Figure 1 shows in diagrammatic form a longitudinal elevation of a turbine partly in section illustrating the principle underlying one form of the invention, Figures 2 and 3 being corresponding detail views showing respectively forms of end-tightened blading and of labyrinth packing suitable for use in conjunction with the turbine of Figure 1, while Figure 4 shows a longitudinal elevation partly in section of a turbine embodying the principle shown in Figure 1;

Figure 5 is diagrammatic view of a modification, while

Similar parts in the different figures are designated by the same reference symbols while in all the figures the steam is supposed to flow through the turbine from left to right.

Figure 1:
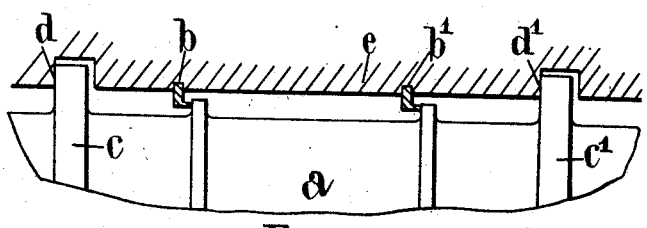

In carrying the invention into effect in its simplest form as applied, for example, to an axial-flow, pressure-flow turbine as shown diagrammatically in Figure 1, the turbine rotor, $a$, being subjected to a unidirectional axial thrust as indicated by the arrow, the rotor, $a$, is provided at each end, and beyond the range of the usual co-acting rings of stator and rotor blades or axially-disposed packings, $b$, $b'$, with a collar, $c$, $c'$, co-acting respectively with corresponding abutments, $d$, $d'$, formed on the stator, $e$, so that these devices serve as locating devices to determine the relative longitudinal positions of the rotor and stator.

Figure 2:
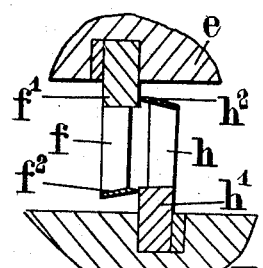
Figure 3:
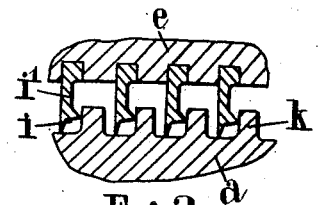

Typical examples of the relative disposition of blades and packings constituting co-operating elements carried by the rotor and stator and suitable for this form of the invention are shown in Figures 2 and 3.

In Figure 2, the stator and rotor blades are indicated by $f$ and $h$, respectively, end-tightening packing, $f^2$, on the stator blades, co-acting with an abutment or barrier member, $h'$, on the rotor blades while end-tightening packing, $h^2$, on the rotor blades, $h$, co-acts with an abutment, $f'$, on the stator blades. Relative movement of the stator to the left or of the rotor to the right would in this case increase the clearances.

Similarly, in Figure 3, relative movement of the stator to the left or of the rotor to the right will increase the clearance between the axially-disposed knife edges, $i$, of the stator packing pieces, $i'$, and the rotor barrier members, $k$, with which they co-act.

It is assumed in the following description that the blades in Figure 2 are substituted for the devices, $b$, $b'$, in Figure 1, and that the unidirectional axial force acts on the rotor, $a$, to force it to the left as shown by the arrow so that the left-hand faces of the two rotor collars, $c$, $c'$, are operative and the blade and packing clearance tend to diminish. In such a case, supposing the clearances to be a minimum when the machine is running under normal conditions of working and that the operative face of each thrust collar, c, c', co-acts with the corresponding abutment, d, d', on the stator, e, then if the rotor expands to a greater extent than the stator, the left-hand thrust-block alone remains operative, the left-hand face of the right-hand collar, c', moving from its co-acting stator abutment, d'. In other words, the rotor expands to the right so that axial clearances are all increased. If on the other hand the stator expands to a greater extent than the rotor, then owing to the longitudinal force acting on the rotor the right-hand thrust-block remains operative and the left-hand block becomes inoperative, the stator expanding to the left and thereby again increasing the clearances concerned. The thrust-blocks as regards axial location therefore act alternatively and automatically in response to changes in temperature conditions, the axial force on the rotor in the example shown in Figure 1 being a factor in their desired action.

From another point of view it will be seen that if the axial blade clearances at any time are greater than the minimum permissible and by differential change of axial dimensions of the rotor and stator due to temperature changes such clearances decrease, a compensatory relative axial displacement of rotor and stator automatically occurs so as to increase the blade clearances when the permissible minimum is reached.

In certain circumstances the above action may be reversed by interchanging the axial positions of the rotor and stator members between which the small clearances exist, so that under differential expansion the above devices will then act to prevent increase of clearance.

In actual practice it is necessary in addition to provide means for preventing the movement of the rotor to the right, (e. g., in Figure 1) when, for example, steam is shut off and the axial thrust on the rotor removed. This is accomplished according to one form by providing comparatively light springs acting on the member or members co-acting with the right-hand surfaces of one or other or both of the thrust collars; such springs are designed to act solely as locators and are not of sufficient strength to take the axial thrust.

Thus, referring to Figure 4, in which is shown a practical embodiment of the principle explained above, the left-hand face of the collar, c, at the steam-end of the turbine co-acts with the pads, m, of a thrust-block enclosed in the housing, n, and adjusted by means of the packings, o, in relation to the stator extension, e', so that the blade clearances are a minimum under normal conditions of working. The right-hand face of the collar, c, on the other hand co-acts with pads, m', which are forced to the left by compartively light locating springs, r, interposed between them and the thrust-block housing n.

Essentially the same arrangements are also provided at the exhaust-end of the turbine, corresponding parts at the two ends of the turbine being denoted by the same reference symbols.

It will be seen that with the construction described, if the rotor expands more than the stator, taking as a datum the position in which the axial clearances are a minimum and both thrust-blocks operative, the steam-end thrust-block alone is operative to take thrust, while if on the contrary the stator expands more than the rotor in the same circumstances, the exhaust-end thrust-block alone is operative, the minimum clearance increasing in both cases.

According to a modification of the above, one or other of the thrust-blocks may be made double-acting, i. e. capable of taking the axial thrust in both directions.

Figure 5:
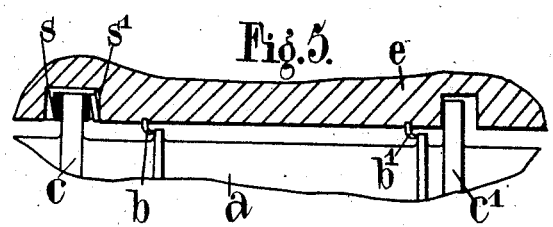

According to one form of such a modification, as shown diagrammticlly in Figure 5, strong springs, s, s', arranged in suitable recesses in the stator body, are provided between each side of the left-hand thrust collar, c, and the stator abutments. The second thrust-block is preferably single-acting, as indicated, its essential elements being initially in contact or provided with a small clearance. With such an arrangement, other parts being as described in the first form of the invention, if the rotor expands more than the stator, it is free to expand to the right and so increase existing clearances, but if the stator expands more than the rotor, it first reduces existing clearances by the amount of the clearance, if any, in the single-acting thrust-block and then expands to the left, compressing the right-hand springs, s', and increasing all clearances. In this case the axial force on the rotor may be arranged in either direction, so that it tends either to increase or decrease axial clearances, but it is preferably dispensed with and the rotor balanced.

Figure 6:
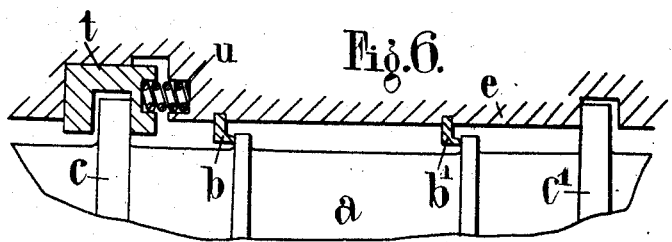
Figure 6 is a diagrammatic view similar to Figure 1 of another modified form of the invention, and Figure 7 a corresponding constructive embodiment.

A further modification of the invention is indicated diagrammatically in Figure 6. In this case the direction of the axial thrust on the rotor is from left to right as shown by the arrow. The left-hand collar, c, of the rotor instead of co-operating directly with the stator is associated therewith through the intermediary of a thrust-receiving member, t, which is pressed to the left against an appropriate abutment in the stator by the strong spring, u, through which the thrust is normally transmitted to the stator and its foundations. Supposing the rotor expands more than the stator, the right-hand face of the collar, c, of the rotor being maintained against the intermediate member, t, by reason of the axial thrust, the left-hand face of the right-hand collar, c', will move from its corresponding abutment, the clearance of blades or packings being thereby increased. Supposing, on the other hand, the stator expands more than the rotor, the stator abutment will be in operative contact with the left-hand face of the right-hand collar, c', the stator expanding to the left so as to compress the spring, u, and produce a clearance between the left-hand face of the intermediate member, t, and its corresponding stator abutment.

The principle exemplified in Figure 6 is embodied in a practical form in Figure 7.
The steam-end thrust-block is in this case double-acting, thrust pads being provided on each side of the collar, c. In the position of minimum clearance between the blades or the like the position of the thrust housing, n, in the stator extension, e', is determined by suitable packings, o, therebetween, while other packings, o', at the right-hand end of the thrust-block housing are provided with the necessary amount of clearance. Rods, v, v', extend from the thrust-block housing through the end of the extension to a crosspiece or yoke, w, strong springs, u, being inserted between the crosspiece and the end of the extension as shown.
Keyed or otherwise secured to the projecting ends of these rods, are worm wheels, x, x', with which co-act worms on the transverse spindle, z, operated by the handwheel, 2.
The collars, $v^2$, are normally out of contact with the casing end plate, $e^2$, and the initial compression of the springs, u, to overbalance the steam thrust on the rotor and hold the thrust housing, n, against its abutment, and liners, o, is obtained by the nuts, $x^2$, the worm wheels, x, x', acting as washers.

The thrust-block at the exhaust end is single-acting with sufficient clearance provided on the right-hand side of the collar, c'.

In order to provide for adjustment, a worm wheel, 3, is disposed between flanges, 4 and 5, on the stator extension, a threaded portion of the hub, 6, of the worm wheel co-acting with a correspondingly threaded part of the thrust-block housing. By this means the axial position of the thrust-block housing can be adjusted while the turbine is running.

If the rotor relatively lengthens, the collar, c', moves out of contact with its co-acting stationary members and the collar, c, determines the relative axial position. If on the other hand the rotor relatively shortens, both collars, c, c', remain operative but the thrust housing, n, is moved to the right, further compressing the springs, u. In both cases the axial clearances of the turbine blades and the like are increased.

If it is desired to reduce the blade or like clearances temporarily, for instance for the purpose of grinding their knife-edges, the liners, o, of the steam-end thrust-block are removed and the exhaust-end thrust-block moved out of action, so that the rotor is under the control of the steam-end thrust-block and the rods, v, v', the collars, $v^2$, of which are held in contact with the end plate, $e^2$, by the springs, u. Rotation of the rods, v, v', by the handwheel, 2, will therefore cause their screwed ends to alter the position of the housing, n, and the rotor.

In all cases the thrust-receiving springs should be initially compressed to such an extent that they do not yield under the actual pressure of the thrust.

If desired any suitable means may be provided for indicating which thrust-block is in operation, as, for example, temperature-indicating apparatus, electrical means or otherwise.

It will be understood that while one type of thrust-block has been illustrated, any suitable type or any suitable alternative means for determining the relative axial position of the relatively rotating bodies may be employed.

It will also be evident in addition that many variations can be made in the particular forms and arrangements of the other parts described above, the scope of the invention being wide enough to include all such variations and also to include the application of the invention to rotary machines other than those specifically referred to above.

We claim—

1. In combination, relatively rotatable machine members; and means for relatively locating said members axially, said locating means acting alternatively in automatic response to certain differential changes in the axial dimensions of said members.
2. In combination, relatively rotatable machine members; co-operating elements carried thereby; and means axially spaced apart for relatively locating said members with said co-operating elements disposed therebetween, said locating means acting alternatively in automatic response to certain differential changes in the axial dimensions of said members.

3. In combination, relatively rotatable coaxial machine members and means for relatively locating said members axially, said locating means acting alternatively in automatic response to certain differential changes in the axial dimensions of said members.
4. In combination, relatively rotatable coaxial machine members; co-operating elements carried thereby; and means axially spaced apart for relatively locating said members with said co-operating elements disposed therebetween, said locating means acting alternatively in automatic response to certain differential changes in the axial dimensions of said members.

5. In combination, relatively rotatable machine members; and thrust bearings for relatively locating said members axially, said thrust bearings acting alternatively in automatic response to differential change in the axial dimensions of said members due to certain temperature changes.

6. In combination, relatively rotatable machine members; co-operating elements carried thereby; and means for automatically preventing the axial clearance between said co-operating elements decreasing below a minimum, said means including thrust bearings for relatively locating said members axially acting alternatively in response to certain differential changes in the axial dimensions of said members.

7. In combination, relatively rotatable machine members, one of which is subject to a uni-directional end thrust, and means for relatively locating said members axially acting alternatively in automatic response to certain differential changes in the axial dimensions of said members, the action of said locating means depending on said uni-directional thrust as a factor.

8. In combination, relatively rotatable machine members; and means for relatively locating said members axially, said locating means acting alternatively in automatic response to differential changes in the axial dimensions of said members due to certain temperature changes.

9. In combination, relatively rotatable machine members, relatively axially movable in response to certain temperature changes, and thrust bearings acting alternatively in cooperation therewith for relatively locating said members axially.

10. A turbine, comprising in combination, relatively rotatable blade-carrying members and means for relatively locating said members axially, said locating means acting alternatively in automatic response to certain differential changes in the axial dimensions of said members.

11. A turbine comprising in combination, stator and rotor members; blades carried thereby; and means axially spaced apart for relatively locating said stator and rotor members with said blades disposed therebetween, said locating means acting alternatively in automatic response to certain differential changes in the axial dimensions of said members.

12. A turbine comprising in combination, relatively rotatable blade-carrying members; and thrust bearings for relatively locating said members axially, said thrust bearings acting alternatively in automatic response to differential changes in the axial dimensions of said members due to certain temperature changes.

13. A turbine comprising in combination, stator and rotor members; blades carried thereby; and means for automatically preventing the axial clearance between said blades decreasing below a minimum, said means including thrust bearings for relatively locating said stator and rotor axially acting alternatively in response to certain differential changes in the axial dimensions of said members.

14. A turbine comprising in combination, stator and rotor members, said rotor member being subject to a uni-directional end thrust; and means for relatively locating said stator and rotor axially acting alternatively in automatic response to certain differential changes in the axial dimensions of said members, the action of said locating means depending on said uni-directional thrust as a factor.

15. A turbine, comprising in combination, relatively rotatable blade-carrying members and means for relatively locating said members axially, said locating means acting alternatively in automatic response to differential changes in the axial dimensions of said members due to certain temperature changes.

16. A turbine, comprising in combination, stator and rotor members having co-acting thrust-receiving surfaces at one end of said turbine and other co-acting thrust-receiving surfaces at the other end of said turbine, and blades having a certain axial clearance carried by said stator and rotor members and disposed between said thrust-receiving surfaces at the two ends of said turbine, said thrust-receiving surfaces and said blades on said stator member being similarly disposed axially in relation to said co-acting thrust-receiving surfaces and said blades on said rotor member.

17. A turbine, comprising in combination, relatively rotatable blade-carrying members, relatively axially movable in response to certain temperature changes, and thrust bearings acting alternatively in cooperation therewith for relatively locating said members axially.

Dated this 23rd day of February, 1925.

In testimony whereof we have signed our names to this specification.

CHARLES ALGERNON PARSONS.
H. I. BRACKENBURY.
LOUIS MORTIMER DOUGLAS.